United States Patent [19]
Hyodo

[11] Patent Number: 5,937,390
[45] Date of Patent: Aug. 10, 1999

[54] ON-LINE ADVERTISING SYSTEM AND ITS METHOD

[75] Inventor: Yoshii Hyodo, Kawasaki, Japan

[73] Assignee: Fujitsu Limited, Kawasaki, Japan

[21] Appl. No.: 08/673,321

[22] Filed: Jun. 28, 1996

[30] Foreign Application Priority Data

Sep. 14, 1995 [JP] Japan .................................. 7-237083

[51] Int. Cl.⁶ .................................................. H04M 15/00
[52] U.S. Cl. ............................... 705/14; 705/1; 705/26;
    348/731; 379/67; 379/142; 379/265; 463/19
[58] Field of Search ............................ 348/731; 379/67,
    379/142, 265; 463/19; 705/1, 14, 26

[56] References Cited

U.S. PATENT DOCUMENTS

| | | | |
|---|---|---|---|
| 5,448,625 | 9/1995 | Lederman | 379/67 |
| 5,589,892 | 12/1996 | Knee et al. | 348/731 |
| 5,594,791 | 1/1997 | Szlam et al. | 379/265 |
| 5,608,788 | 3/1997 | Demlow et al. | 379/142 |
| 5,679,077 | 10/1997 | Pocock et al. | 463/19 |

*Primary Examiner*—Kevin J. Teska
*Assistant Examiner*—Thuan Do
*Attorney, Agent, or Firm*—Staas & Halsey LLP

[57] ABSTRACT

When a user accesses an advertisement on an on-line advertising system from a user terminal on the Internet using a WWW browser, an advertisement including the toll-free telephone number of a store is sent to the user terminal. When the user calls this toll-free telephone number, a toll-free call control system connects that call from the user to the store and, at the same time, obtains information on that access to the toll-free telephone number as log information. This log information is posted to the service provider, and the service provider analyzes the hit rate from this log information and the WWW browser access log. From this result, the on-line service provider or the advertiser can determine the effectiveness of that advertisement.

11 Claims, 9 Drawing Sheets

| MONTH AND DAY OF CONVERSATION | START TIME | | | AREA FROM WHICH REQUEST ORIGINATED | DURATION OF CONVERSATION | | | MESSAGE UNITS | CHARGE OF TELEPHONE CALL (YEN) |
| --- | --- | --- | --- | --- | --- | --- | --- | --- | --- |
| | HOUR | MINUTE | SECOND | | HOURS | MINUTES | SECONDS | | |
| 6 | 8 | 33 | 21 | OKAYAMA | 0 | 3 | 10 | 20 | 200 |
| 6 | 9 | 10 | 57 | OSAKA | 0 | 4 | 23 | 27 | 270 |
| 6 | 9 | 15 | 37 | TOKYO | 0 | 0 | 38 | 2 | 20 |
| ... | ... | ... | ... | ... | ... | ... | ... | ... | ... |
| 7 | 9 | 9 | 51 | TOKYO | 0 | 0 | 25 | 2 | 20 |
| 7 | 9 | 42 | 06 | OKAYAMA | 0 | 7 | 43 | 47 | 470 |
| 7 | 11 | 45 | 27 | KUWANA | 0 | 4 | 00 | 24 | 240 |
| ... | ... | ... | ... | ... | ... | ... | ... | ... | ... |

| TOLL-FREE TELEPHONE NUMBER | MONTH AND DAY OF CONVERSATION | START TIME | DURATION OF CONVERSATION | MESSAGE UNITS | AREA WHERE CALL ORIGINATED | ACCESS/ NO ACCESS |
|---|---|---|---|---|---|---|
| 0120-222108 | 19970606 | 083321 | 0003100 | 20 | OKAYAMA | YES |
| 0120-222108 | 19970606 | 091057 | 0004230 | 27 | OSAKA | NO |

FIG. 8

| TOLL-FREE TELEPHONE NUMBER | STORE IDENTIFI- CATION NAME | TOLL-FREE CALL SCREEN (HTML FILE NAME) |
|---|---|---|
| 0120-222108 | THE XX STORE | A.HTML |

ON-LINE ADVERTISING SYSTEM AND ITS METHOD

BACKGROUND OF THE INVENTION

1. Field of the Invention

This invention relates to an on-line advertising system to broadcast advertising information about products and services on a network in on-line shopping using a network, and its method.

2. Description of the Related Art

At present, in on-line shopping using the Internet, a WWW (World Wide Web) Server compiles access log information to determine the needs of users who access the WWW Server. In this kind of on-line shopping, in a system that provides advertising of products and services, the user uses existing media (telephone and FAX inquiries) to order and purchase products and services carried on the WWW Server.

Figure 1:
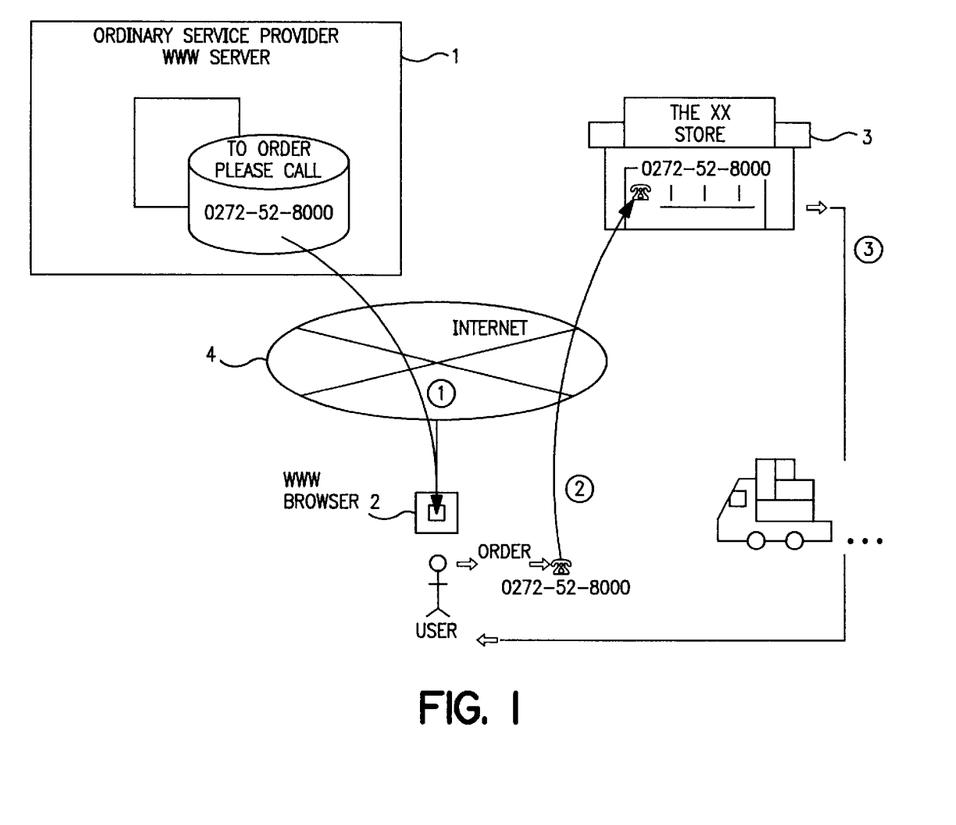
FIG. 1 is a diagram showing prior on-line shopping system.
Figure 6:
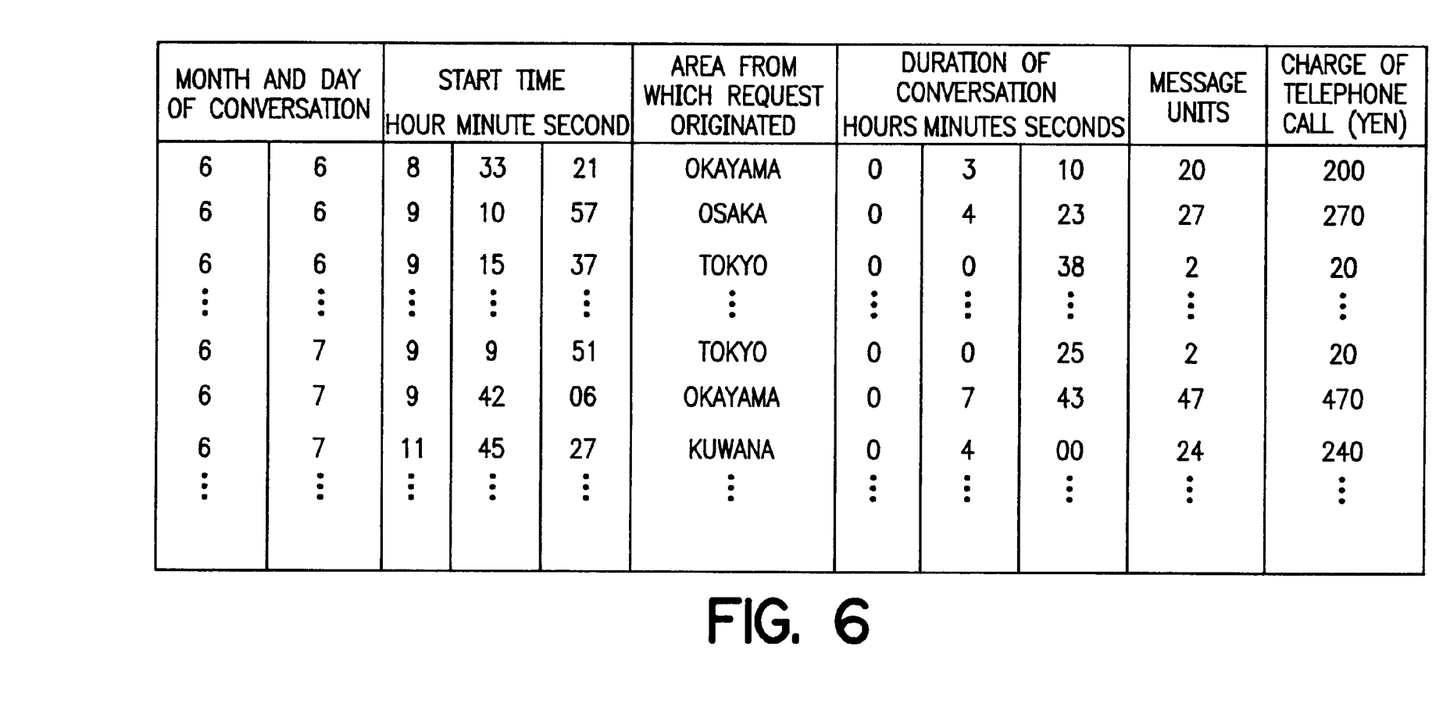
FIG. 6 is a diagram showing a sample toll-free telephone number bill.

FIG. 1 shows an existing on-line shopping system. In FIG. 1, System 1 of a service provider, who has a WWW Server, is connected to user terminal 2, which has a WWW browser, via the Internet 4. A WWW browser is software that is able to easily jump to a site on the Internet 4 that has related information, and a target file, by using a pointing device on the screen of the user terminal 2 and performing a click operation. In FIG. 6, on-line shopping is performed by the following procedure:

1) The user accesses a WWW Server on the Internet 4;
2) The user places a telephone call to an actual store 3(The XX Store) to order a product that he/she likes. (At this time, the normal telephone number 0272-52-8000 of Store 3 given in the advertisement is used);
3) The Store 3 and the user discuss the matter, and when the customer decides to make the purchase, the product is shipped from the store 3.

However, the existing on-line shopping system described above has problems such as the following.

The frequency of access to, for example, a product that is listed is known, to some extent, from the WWW Server access log. Even so, since information related to ordering and purchasing does not pass through the WWW Server, it is not known how many of the users who accessed the WWW site actually purchased the product (the hit rate). In order for the provider to know whether and to what extent a certain product is selling, it is necessary to ask the actual store directly. However, some cases in stores also advertise in ways other than on line, such as in newspapers and magazines. In such cases, it is often impossible to determine whether the user's motivation to buy the product came from the advertisement on the Internet or from some other information. For this reason, even if the store is asked how well the product is selling, it is difficult for the provider to determine the effectiveness of the on-line advertisement.

In another case, the store may for example, open another telephone line exclusively for Internet use. All that is known is how many times calls to that telephone number were received. Consequently, the above problem cannot be solved unless the store itself consciously goes to the trouble to collect statistics on telephone calls received.

SUMMARY OF THE INVENTION

An object of this invention is to provide on-line advertising system and its method that will enable a service provider to determine the effectiveness of on-line advertising in on-line shopping using a network.

The on-line advertising system in this invention which is an information processing system that provides an advertiser's advertising on-line in response to access from users, has an advertising information storage section, a communication section, and a log information recording and analysis section.

The advertising information storage section stores advertising information including a toll-free telephone access number for connecting to the advertiser.

The communication section sends the said advertising information to a user terminal when a request for access to the said advertising information is received from the said user terminal via the said network.

The log information recording section stores 1st access information relating to the said user's accessing of the said advertising information when the said advertising information is accessed from a user terminal via the said network. This 1st access information is log information on how much users have accessed each part of the home page using the WWW browser when, for example, doing on-line shopping on the Internet.

The analysis section receives the 2nd access information relating to access to the said toll-free telephone access number, analyzes the said 1st and 2nd access information, and outputs the analysis results. This 2nd access information is for example the bill for the toll-free telephone number; the analysis section compiles and analyzes the 1st access information, for example the number of times the advertising information is accessed according to the said log, and the 2nd access information, for example the number of calls recorded on the bill for the toll-free telephone number.

In the information processing system according to this invention, when a user accesses advertising in an on-line advertising system from a user terminal, advertising information including the advertiser's toll-free access telephone number stored in the advertising information storage section is sent to the user terminal by the communication section and stored as the 1st access information relating to access by the said user to the said advertising information in the log information storage section. Next, when the user calls the toll-free telephone number from the user terminal, the analysis section compiles and analyzes the hit rate for that advertisement from the said 1st access information and the 2nd access information, which is access information for access to that toll-free telephone number. From this result, the service provider for the on-line advertising or the advertiser can determine the effectiveness of that advertisement.

DESCRIPTION OF THE PREFERRED EMBODIMENT

Figure 2:
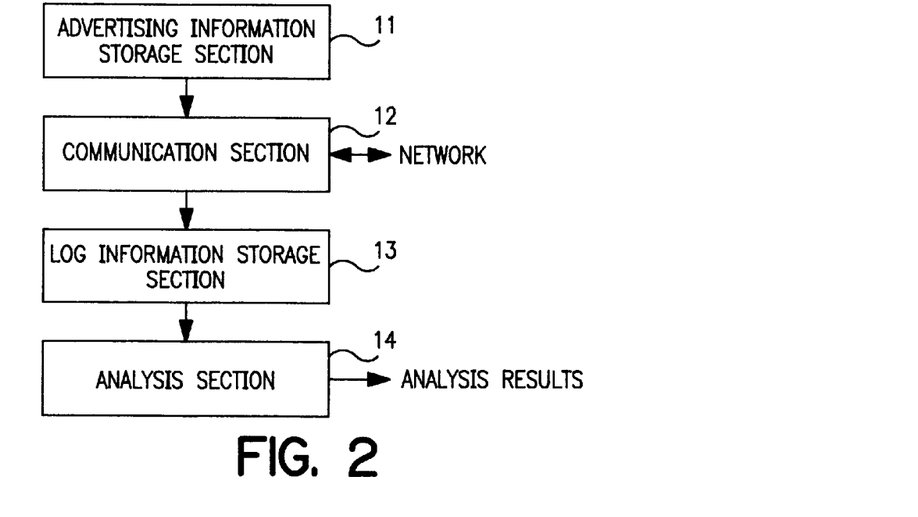
FIG. 2 is a diagram showing the principle of this invention.

FIG. 2 is a diagram showing the principle of the on-line advertising system of this invention. The on-line advertising system shown in FIG. 2 is achieved by means of an information processing system which is connected to a network, and has an advertising information storage section 11, a communication section 12, a log information storage section 13 and an analysis section 14.

The advertising information storage section 11 stores advertising information including a toll-free telephone access number connected to the advertiser.

In practice, "toll-free" refers to the wide-area reversed charges telephone service operated by NTT (Nippon Telephone and Telegraph), but of course for purposes of this invention "toll-free" is not limited only to the NTT service but refers to any telephone service for which access information such as the number of times that a line is accessed is provided to the party contracting for use of the line.

The communication section 12 sends advertising information to the user terminal when a request to access the said advertising information is received from a user terminal via the said network.

The access number included in the said advertising information is for example a toll-free telephone number or a FAX (facsimile) number, and is used when a user orders a product or service from an advertiser who is providing it. In general, the number of times that number was called is known from the toll-free service bill, so the on-line advertising service provider can investigate the impact that an advertisement has. For example, the number of times and times of day when users access the advertiser are compiled as statistical data which can be provided to the advertiser.

The log information storage section 13 stores the 1st access information relating to user access to the said advertising information; when the said advertising information is sent to the said user terminal, the communication section 12 stores that 1st access information in the log information storage section 13.

When on-line shopping is done on the Internet, log information that shows what parts of the home page users accessed using WWW browsers is stored as 1st access information in the log information storage section 13.

The analysis section 14 receives the 2nd access information relating to access to the said toll-free access number, analyzes the 1st and the 2nd access information, and outputs the analysis results.

The toll-free service bill, for example, is used as the 2nd access information. From the number of conversation records included in this 2nd access information and the number of access records included in the 1st access information stored in the log information storage section 13, the number of effective accesses to the corresponding advertising information can be estimated. The analysis section 14 outputs information relating to this number of effective accesses as analysis results. The output analysis results are provided from the provider to the advertiser as necessary.

Figure 3:
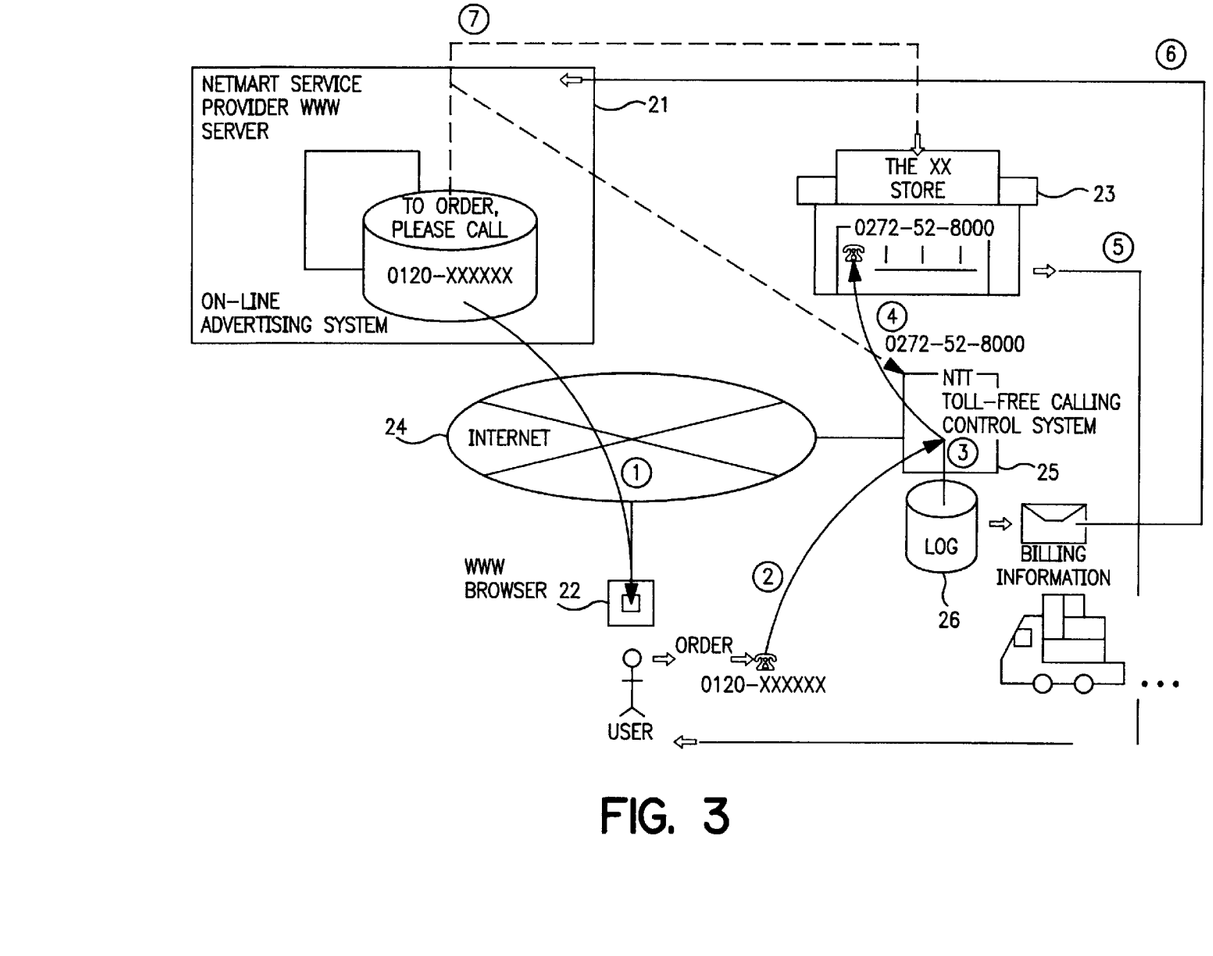
FIG. 3 is a diagram showing the form in which on-line shopping is carried out.

For example, the advertising information storage section 11 and the log information storage section 13 in FIG. 2 correspond to the memory of the computer which forms the on-line advertising system 21 in FIG. 3 in this embodiment. The communication section 12 and the analysis section 14 correspond to the processing unit of that computer.

We now explain an embodiment of this invention in detail, referring to the drawings.

FIG. 3 shows on-line shopping in an embodiment of this invention. In FIG. 3, the on-line advertising system 21 of a service provider who has a WWW Server is connected to a user terminal 22 which has a WWW browser through the Internet 24. The on-line advertising system 21 includes a computer that has a CPU (Central Processing Unit) and a memory, and places advertising information on the Netmart home page of the provider on the Internet 24. In FIG. 3, shopping is done by the following procedure.

1) The user accesses (refers to) on-line advertising placed on a WWW Server on the Internet 24 from the user terminal 22, using a WWW browser. At this time, the on-line advertising system 21 displays an explanation of the products of XX Store 23 and a toll-free telephone number 0120-xxxxxx on the screen of the user terminal 22, and stores information such as the user's identification information, access time and the page that was accessed as an access log.
2) The user calls the toll-free telephone number in the advertisement and orders a product that he/she likes.
3) The telephone company's toll-free call control system 25 logs in toll-free call access information such as the user's telephone number, the date and time when the call was received and the conversation time, and stores it as the log 26.
4) The toll-free call control system 25 connects the call from the user to the actual telephone number 0272-52-8000 of the XX Store 23.
5) The Store 23 and the user talk to each other; if the user decides to buy, the product is sent from the Store 23.
6) The contents (billing information) of the toll-free system log 26 are posted from NTT to the service provider.
7) As necessary, the service provider compiles and analyzes the access logs on the WWW Server and the toll-free telephone call access logs, and provides the results to the XX Store 23 that placed the advertisement.

In this embodiment, the service provider concludes a contract for toll-free telephone service with the telephone company in advance, and registers the telephone number of the advertiser who is connected as the destination of the toll-free telephone calls. In this case, the bill for the toll-free telephone calls is sent to the provider. The provider requests advertisers not to use that toll-free telephone number for personal purposes. If it were used for personal purposes, those records would then be included in the toll-free calls access log, and it would be impossible to distinguish billing information for personal calls from that for calls from other users.

Of course, the advertiser himself can contract directly with the telephone company for toll-free telephone service, but in that case the advertiser has to do the log analysis. When the provider contracts for the toll-free telephone service, the provider bills the advertiser for the telephone charges assessed by the telephone company.

When a user uses the toll-free telephone service to order a product from a store, the provider obtains information as to how many times the user contacted the store and how long the conversations lasted in the form of a bill from the telephone company. By comparing this information with each page of the telephone log, the effectiveness of the advertisement on the Internet can be analyzed statistically. In addition, when telephone calls are placed through the toll-free service, the telephone company automatically transfers the calls to the store's telephone number, so the store does not have to worry about whether the call is from a user who saw the advertisement on the Internet.

Figure 4:
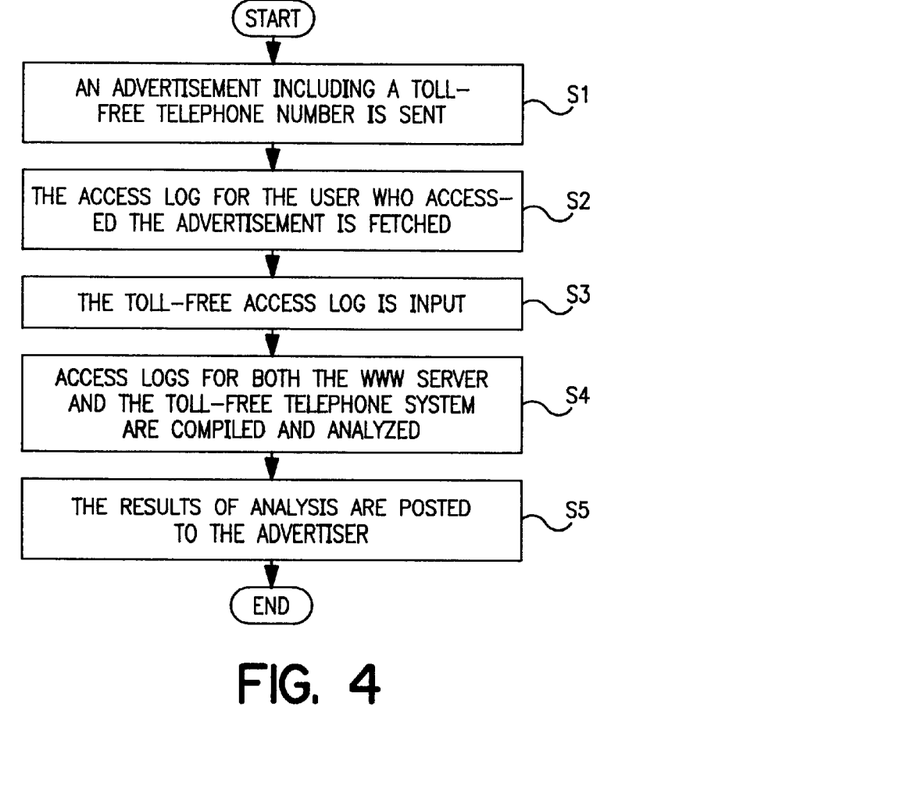
FIG. 4 is an operating flow chart showing the provider's processing.

FIG. 4 is a flow chart of the processing performed by the service provider in relation to on-line shopping. When the processing shown in FIG. 4 starts, the WWW Server of the on-line advertising system 21 first displays an on-line advertisement including a toll-free telephone number on a network (Step S1), then compiles an access log of users who access that telephone number (Step S2). The access log information is obtained every time the user changes to a different displayed page by a clicking operation.

Figure 5:
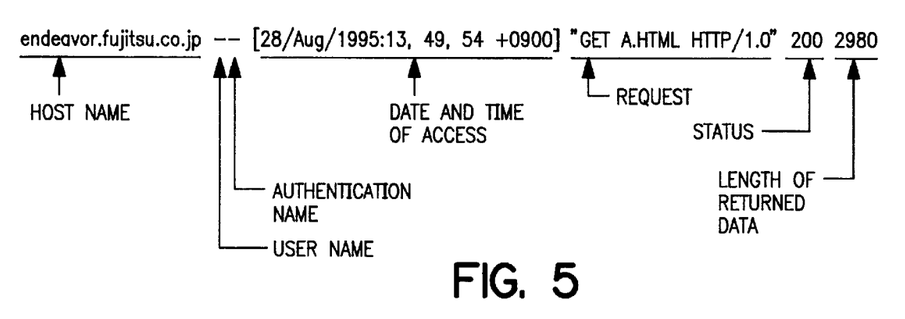
FIG. 5 is a diagram showing an example of an access log.

FIG. 5 shows an example of an access log on the WWW Server. The access log in FIG. 5 includes the host name, user name, identification name, date and time of access, request, status, and length of returned data. The host name shows the name of the host computer of the on-line advertising system 21; the user name and identification name identify the user who accessed the advertisement. The request shows information in the HTML (Hyper Text Markup Language) file which the user requested using a WWW browser; the data length shows the length of data that the WWW Server returned to the user terminal 22. A.HTML in the request corresponds to the file name of the HTML file.

Next, the provider obtains an access log for the toll-free telephone service from the telephone company in the form of a bill, and inputs it to the on-line advertising system 21 (Step S3).

FIG. 6 shows an example of a toll-free telephone service bill. The bill shown in FIG. 6 shows the toll-free telephone number (not shown in the figure), and also the month and day of each telephone conversation, the time when each conversation started, the area from which the call was made, the conversation time, the number of message units and the charge for the call. Thus the bill for the toll-free telephone service charge provides not only information on the total number of calls in a given time period, but also information on each telephone conversation. Consequently, it is easy to determine how many people called in a given time period.

The on-line advertising system 21 compiles and analyzes the access log obtained from the WWW Server according to a program entered in advance and the toll-free telephone service access log (Step 4). Here, for example, the number of times the on-line advertisement was accessed during a given time period is compiled from the WWW Server access log, and so is the number of telephone conversations in the same time period is compiled from the toll-free telephone service access log. Then the ratio of telephone calls to accesses to the Netmart during that time period (the hit rate) is calculated. In the case of advertising in which the products change seasonally, the hit rate during any desired time period can also be calculated.

Then the provider posts the analysis results to the advertiser (Step S5), and the processing ends. The analysis results can be posted either on-line, for example by electronic mail from the on-line advertising system 21 to the advertiser's terminal, or by regular mail.

When the number of accesses recorded in the access log is relatively small, then, instead of the on-line advertising system 21 compiling and analyzing the access logs in Step S4, the provider can do this calculation by hand.

Next, referring to FIGS. 7 through 10, we explain the processing in Steps S3 and S4 in FIG. 4 in detail.

Figure 7:
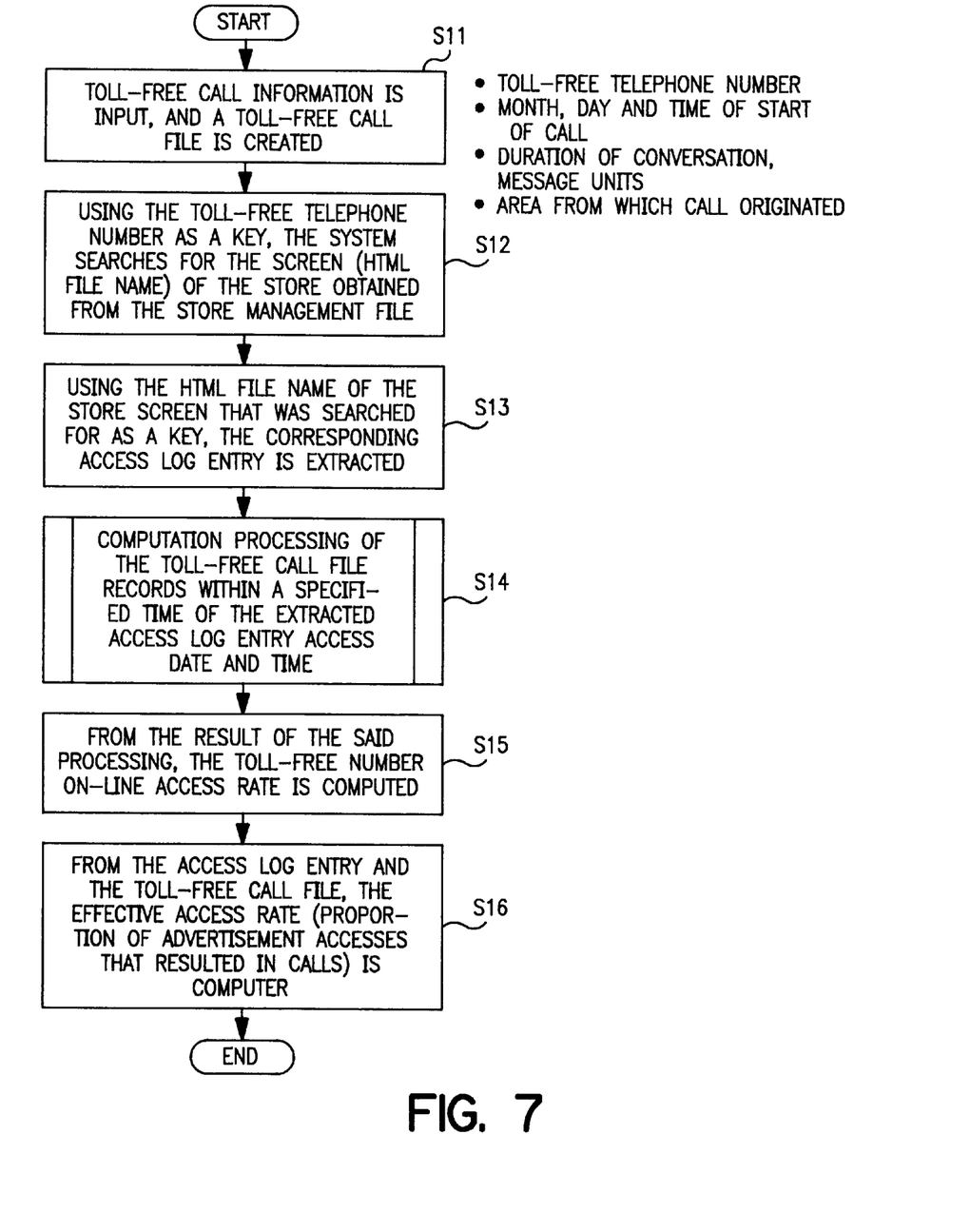
FIG. 7 is an operating flow chart of the log analysis processing.

FIG. 7 is an operating flow chart of the log analysis processing corresponding to Steps S3 and S4 in FIG. 4. When the processing in FIG. 7 is started, first the provider inputs the toll-free telephone service billing information to the on-line advertising system 21, then the on-line advertising system 21 creates a toll-free telephone service file base on the information that was input (Step S11).

Figure 8:
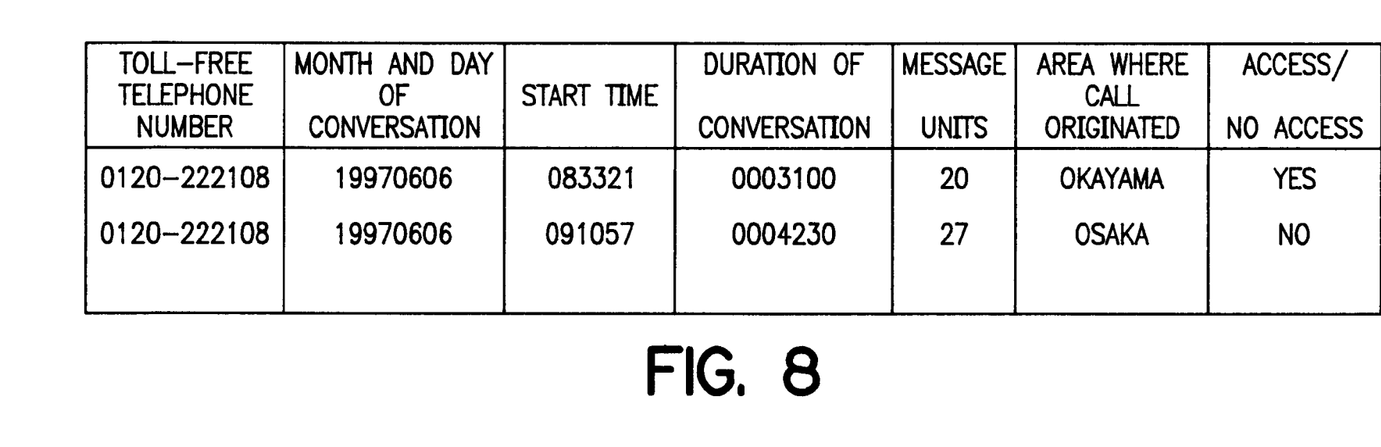
FIG. 8 is a diagram showing an example of a toll-free dialing file.

FIG. 8 shows an example of a toll-free telephone service file created at this time. In the toll-free telephone service file shown in FIG. 8, the toll-free telephone number, the month and day of the call, the time when the conversation started, the duration of the conversation, the message units, the area from which the call originated and whether or not there was access are recorded for each telephone conversation. The access/no access item among these is used as a control flag in the log analysis processing.

Next, using the toll-free telephone number as a key, the on-line advertising system 21 searches for the corresponding HTML file name on the store's screen from a previously created store management file (Step S12).

Figure 9:
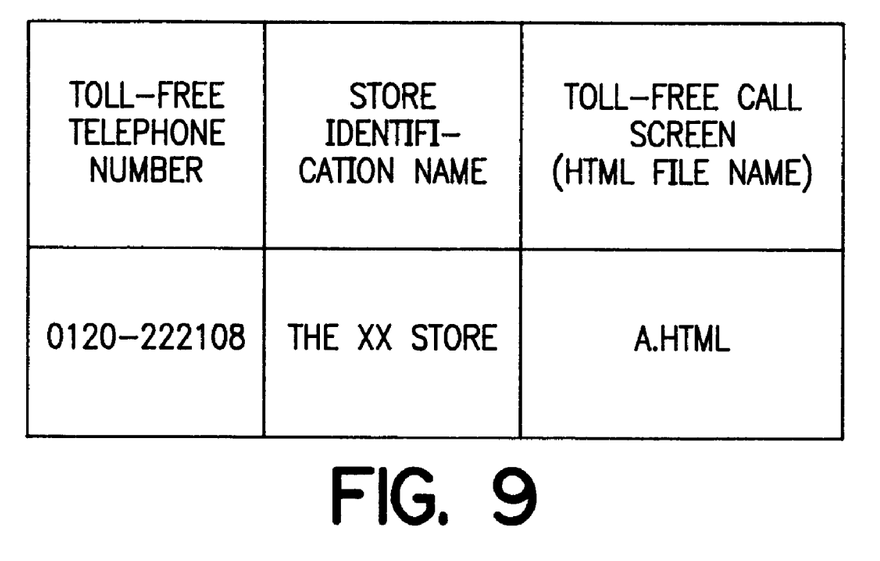
FIG. 9 is a diagram showing an example of a store management file.

FIG. 9 shows an example of a store management file used at this time. The toll-free telephone number, the store's identification name, and the relationship to the HTML file name on the screen display that includes the toll-free telephone number (the toll-free telephone screen display) are recorded in the store management file in FIG. 9.

Next, the on-line advertising system 21 extract the corresponding on-line advertising access log as a key to the HTML file name on the store screen display being searched for (Step S13). Then, referring to the access date and time of each extracted access log entry, the records of the toll-free telephone service file in a certain time period including those log entries are computed (Step S14).

Figure 10:
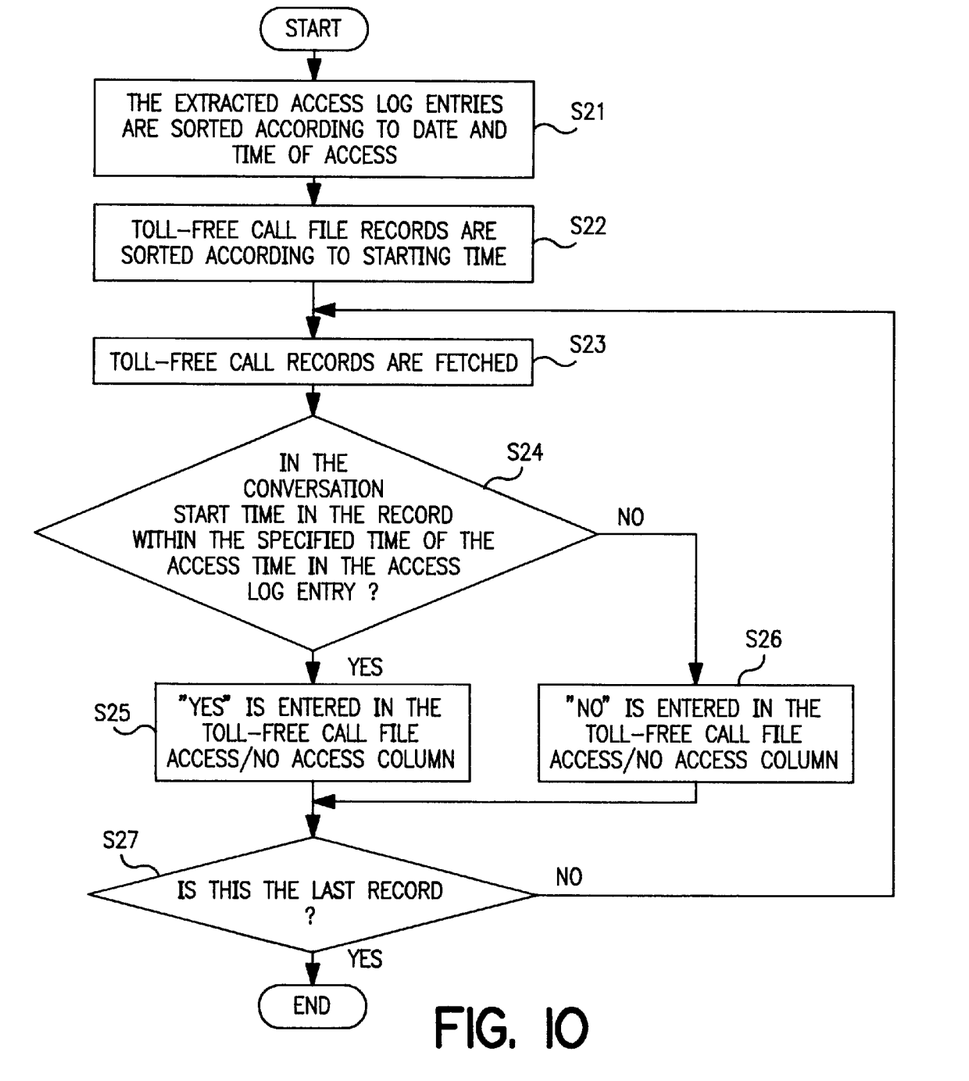
FIG. 10 is an operating flow chart of record computation processing.

FIG. 10 is an operating flow chart of the record computation processing performed in Step S14 in FIG. 7. In FIG. 10, when the processing starts the on-line advertising system 21 first sorts the extracted access log entries in order of the access day and time (Step S21), then sorts the toll-free telephone file records in order of the time of the start of each call (Step S22).

Next, one record at a time is fetched from the toll-free telephone service file (Step S23); from the fetched record, it is judged whether or not the start time in the record is within the time period starting from the access times in one of the access log entries (step S24). If the starting time is within one of the specified time periods, then "yes" is stored as the flag in the access/no access item for that record (Step S25); if not, then "no" is stored as the flag (Step S26).

Next, it is judged whether or not that record is the last record (Step S27); if it is not the last record then the next record is fetched (Step S23) and the processing starting with Step S24 is repeated. If it is the last record then the processing ends. In this way, the access/no access item in the toll-free telephone service file record becomes "yes" for those calls in the on-line advertising access log that occurred within the specified time period.

Next, the on-line advertising system 21 computes the ratio of records in the toll-free telephone service file for the specified time period that have the same store toll-free telephone number for which the access/no access item is "yes" as the toll-free telephone service file on-line access rate (Step S15 in FIG. 7).

Next, the number of records for which the access/no access item is "yes" is divided by the number of access log entries extracted in Step S13 to compute the effective access rate (the rate of accesses that resulted in telephone calls, or the hit rate) (Step S16), and then the processing ends.

This kind of on-line advertising system compares the times of access to the on-line advertising to the times of access to the toll-free telephone number and judged that a call that immediately follows access to the advertisement is from the same user. Consequently, it is possible to statistically determine how many of the accesses to an on-line advertisement were effective accesses resulting in an order or inquiry. The provider can use the results of this analysis to set an appropriate advertising rate, and the advertiser can use the same results to compare the effectiveness of on-line advertising with other forms of advertising.

Other forms of advertising, such as catalogue advertising, give the same toll-free telephone numbers that are given in the system of this invention. When a user calls after seeing such an advertisement a bill for the toll-free telephone call is sent to the advertiser, but, in contrast to the system of this invention, there is no access log for the advertisement, so a hit rate such as described above cannot be found easily.

In the embodiment described above, the advertiser does not have to have a physical store, but can merely act as an intermediary for a vendor who provides products and/or services. In addition, the methods by which the user places an order for products are not limited to telephone calls, but can include any method such as FAX (facsimile) for which a toll-free telephone contract exists. When FAX is used, it is sufficient for the toll-free FAX number to be given in the on-line advertisement.

According to this invention, in on-line shopping it is possible to investigate the relationship between information on user access to on-line advertising and information on access to a supplier of (for example) products. This makes it possible for an on-line advertising service provider or advertiser to determine the effectiveness of that advertising.

What is claimed is:

1. An on-line advertising system for use in an information processing system connected to a network and providing an advertisement on-line in response to an access from a user, said advertising system comprising:

an advertising information storage section that stores advertising information including information for presenting to the user a toll-free telephone number for toll-free telephone connection to an advertiser corresponding to the advertising information;

a log information storage section that stores first access information including information indicating a date and a time of an access by the user to the advertising information;

a communication section that sends the advertising information to a user terminal of the user when a request for access to the advertising information is received from the user terminal over the network and stores the first access information in said log information storage section when said communication section sends the advertising information to the user terminal; and an analysis section that receives second access information including information indicating a date and a time of a telephone connection using the toll-ree telephone number, analyes the first and second access information for a relationship between the respective dates and times indicated thereby, and outputs an analysis result.

2. The on-line advertising system according to claim 1, wherein said analysis section analyzes the relationship between the respective dates and times indicated by the first and second access information when the advertising information includes information for presenting to the user a name of the advertiser.

3. The on-line advertising system according to claim 1, wherein:

the first access information includes information indicating a count of successive accesses to the advertising information since a specified date and time;

said analysis section generates a count of all connections using the toll-free telephone number that occurred within a specified time period following the specified date and time; and said analysis section calculates a proportion of effective accesses to the advertising information, based on the count of accesses and the count of connections.

4. The on-line advertising system according to claim 1, wherein said analysis section receives billing information for a usage charge for the toll-free telephone number, the billing information including the second access information.

5. The on-line advertising system according to claim 1, wherein said analysis section calculates the proportion of effective accesses to said advertising information based on a number of accesses indicated by the first access information and a number of toll-free telephone connections indicated by the second access information.

6. A computer-readable storage medium encoded with a program for controlling a computer connected to a network to provide an advertisement on-fine in response to accesses from users, said program comprising the functions of:

receiving a request for access to advertising information, the request for access being transmitted over the network from a user terminal;

sending the advertising information to the user terminal as the requested access in response to the request for access, the advertising information including information for presenting to a user of the user terminal a toll-free telephone number for toll-free telephone connection to an advertiser corresponding to the advertising information;

storing first access information indicating a date and time of the request for access; and analyzing the first access information and second access information for a relationship between respective dates and times indicated thereby and outputting an analysis result, the second access information indicating a date and time of a telephone connection using the toll-free telephone number.

7. The storage medium according to claim 6, wherein the storing function of said program comprises storing the first access information with the advertising information when the advertising information is sent to the user terminal.

8. An on-line advertising method for providing an advertisement on-line in response to requests for access from users connected to a network, the method comprising steps of:

storing advertising information including information for presenting to a user accessing the advertising information a toll-free telephone number for toll-free telephone connection to an advertiser corresponding to the advertising information;

sending the advertising information to a user terminal of the user when a request for access to the advertising information is received from the user terminal over the network;

storing first access information indicating a date and time of the request for access; and analyzing the first access information and second access information for a relationship between respective dates and times indicated thereby and outputting an analysis result, the second access information indicating a date and time of a telephone connection using the toll-free telephone number.

9. The on-line advertising method according to claim 8, wherein the storing step comprises storing the first access information with the advertising information when the advertising information is sent to the user terminal.

10. A network server for on-line advertising, said server comprising:

a storage unit that stores advertising information corresponding to an advertiser and indicating a telephone number for toll-free telephone communication with the advertiser through a toll-free calling system, the toll-free calling system having a control system that collects telephone access information indicating a date and time of a telephone connection using the telephone number and forwards the telephone access information to an operator of said server; and a communication unit that sends the advertising information to a user terminal when a request for access to the advertising information is received from the user terminal over a data network and generates user access information when the advertising information is sent, the request for access indicating selection of the advertising information by a user accessing said server with the user terminal through the data network and the user access information indicating a date and time of the request for access; and an analysis unit receiving the telephone access information and the user access information, performing an analysis for a relationship between the respective dates and times indicated thereby, and outputting an analysis result.

11. A system for advertising over a computer network, said system comprising:

a storage section that stores advertising information corresponding to an advertiser and indicating a telephone number for toll-free telephone communication with the advertiser;

a communication section that sends the advertising information to a user terminal in response to a request for access to information corresponding to the advertising information;

a log information storage section that stores first access information indicating respective dates and times of user accesses to the advertising information;

an analysis section that receives second access information indicating respective dates and times of telephone connections using the telephone number, analyzes the first and second access information to identify a relationship between the respective dates and times indicated thereby, and outputs an analysis result.

* * * * *